US008139921B2

(12) United States Patent
Yuasa

(10) Patent No.: US 8,139,921 B2
(45) Date of Patent: Mar. 20, 2012

(54) PROGRAM RECORDING RESERVATION SYSTEM AND REMOTE CONTROLLER

(75) Inventor: Naoki Yuasa, Chiba (JP)

(73) Assignee: Sony Corporation, Tokyo (JP)

( * ) Notice: Subject to any disclaimer, the term of this patent is extended or adjusted under 35 U.S.C. 154(b) by 1197 days.

(21) Appl. No.: 11/550,161

(22) Filed: Oct. 17, 2006

(65) Prior Publication Data
US 2007/0098360 A1     May 3, 2007

(30) Foreign Application Priority Data

Oct. 31, 2005   (JP) .................................. 2005-316976

(51) Int. Cl.
*H04N 5/76*      (2006.01)
(52) U.S. Cl. ........ 386/295; 386/248; 386/292; 386/294; 386/297; 725/39; 725/40; 725/44; 725/50; 725/61
(58) Field of Classification Search .................. 386/46, 386/83, 95, 111, 124–126, 200, 218, 219, 386/230, 239–241, 353, 248, 292–295, 297; 725/37–40, 44, 46, 47, 50, 53, 58, 61
See application file for complete search history.

(56) References Cited

U.S. PATENT DOCUMENTS

| | | | | |
|---|---|---|---|---|
| 6,577,812 | B1 * | 6/2003 | Kikuchi et al. | 386/248 |
| 6,584,272 | B1 * | 6/2003 | Fukushima et al. | 386/46 |
| 6,885,809 | B1 * | 4/2005 | Asada | 386/46 |
| 7,181,128 | B1 * | 2/2007 | Wada et al. | 386/83 |
| 7,380,206 | B1 * | 5/2008 | Usuda | 715/236 |
| 7,773,859 | B1 * | 8/2010 | Potrebic et al. | 386/83 |
| 2002/0054754 | A1 * | 5/2002 | Kikuchi et al. | 386/83 |
| 2002/0172496 | A1 * | 11/2002 | Gunji et al. | 386/46 |
| 2003/0099460 | A1 * | 5/2003 | Imada et al. | 386/52 |
| 2005/0155065 | A1 * | 7/2005 | Lee | 725/58 |
| 2005/0286872 | A1 * | 12/2005 | Kobayashi | 386/95 |
| 2006/0018625 | A1 * | 1/2006 | Johnson et al. | 386/46 |
| 2006/0078277 | A1 * | 4/2006 | Miyazaki | 386/46 |
| 2006/0239642 | A1 | 10/2006 | Yuasa et al. | |

FOREIGN PATENT DOCUMENTS

JP            11-136646       5/1999

(Continued)

OTHER PUBLICATIONS

U.S. Appl. No. 11/550,514, filed Oct. 18, 2006, Yuasa.

*Primary Examiner* — Thai Tran
*Assistant Examiner* — Mishawn Dunn
(74) *Attorney, Agent, or Firm* — Oblon, Spivak, McClelland, Maier & Neustadt, L.L.P.

(57) ABSTRACT

A program recording reservation system includes a recording apparatus including a recorder for recording a broadcast program; and a remote controller for making a recording reservation for the recording apparatus. A content management section is provided for managing, as recording parameters, an average recording bit rate for each of a plurality of provided recording modes and the remaining recordable capacity of the recorder. Date and time at which a broadcast program is scheduled to be broadcast are obtained as program information. A recording capacity necessary for recording a program shown in the program information is computed. On the basis of the average recording bit rate for each recording provided by the recorder, the duration of the broadcast program, and the remaining recordable capacity, the capability or incapability of recording of a broadcast program is determined. The determined capability or incapability of recording for each program is displayed in the program table.

9 Claims, 5 Drawing Sheets

FOREIGN PATENT DOCUMENTS

| | | |
|---|---|---|
| JP | 2001-339696 | 12/2001 |
| JP | 2003-78851 | 3/2003 |
| JP | 2003-189198 | 7/2003 |
| JP | 2004-129289 | 4/2004 |
| JP | 2005-191950 | 7/2005 |
| JP | 2005-244372 | 9/2005 |
| JP | 2005-244576 | 9/2005 |

* cited by examiner

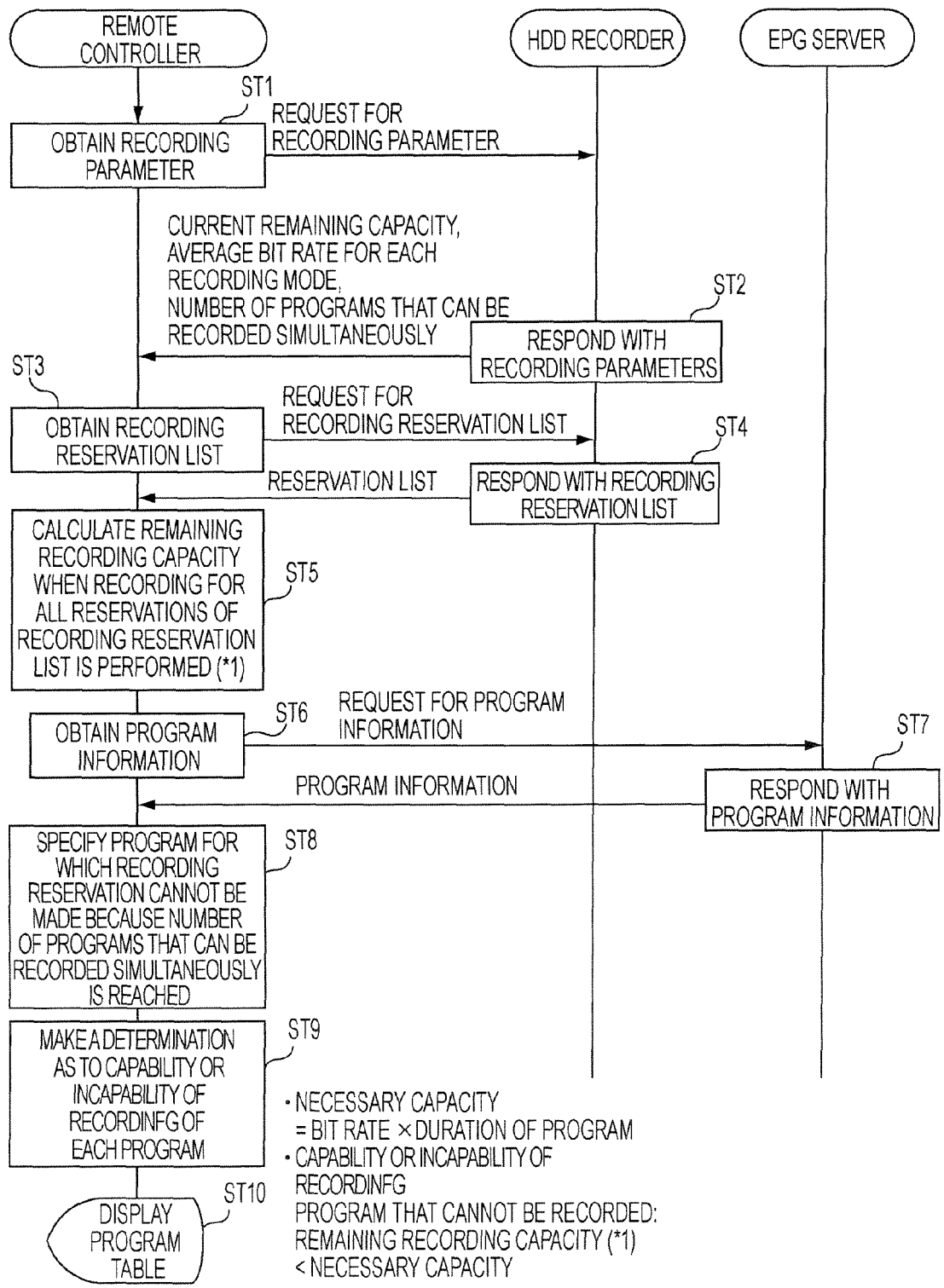

FIG. 4A
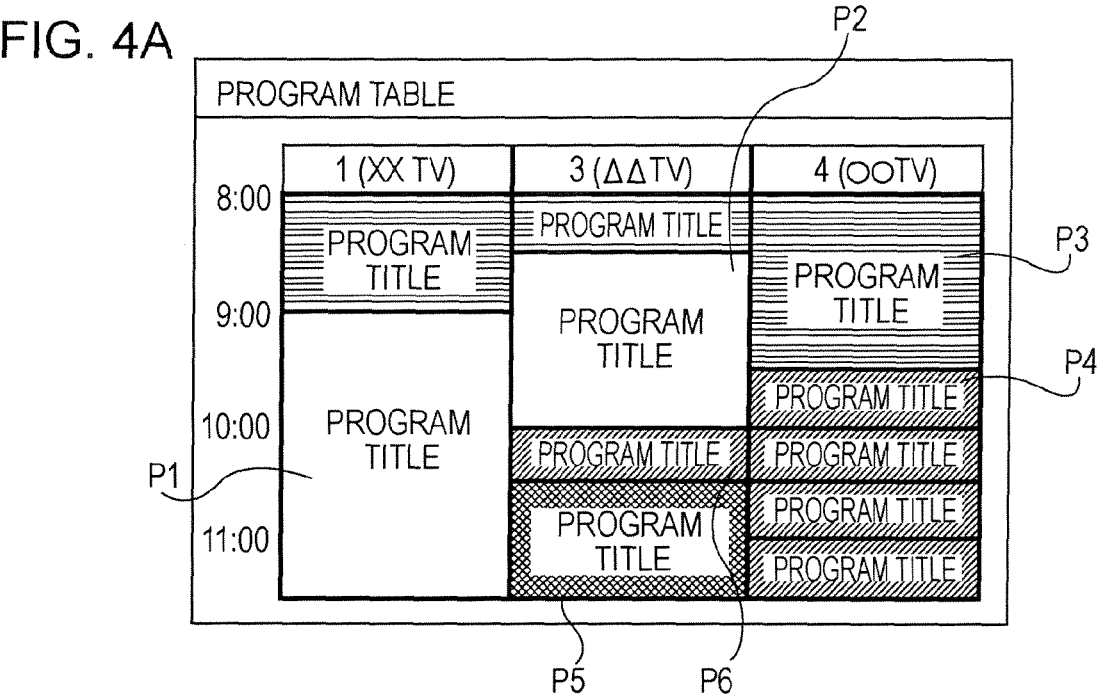
FIG. 4B
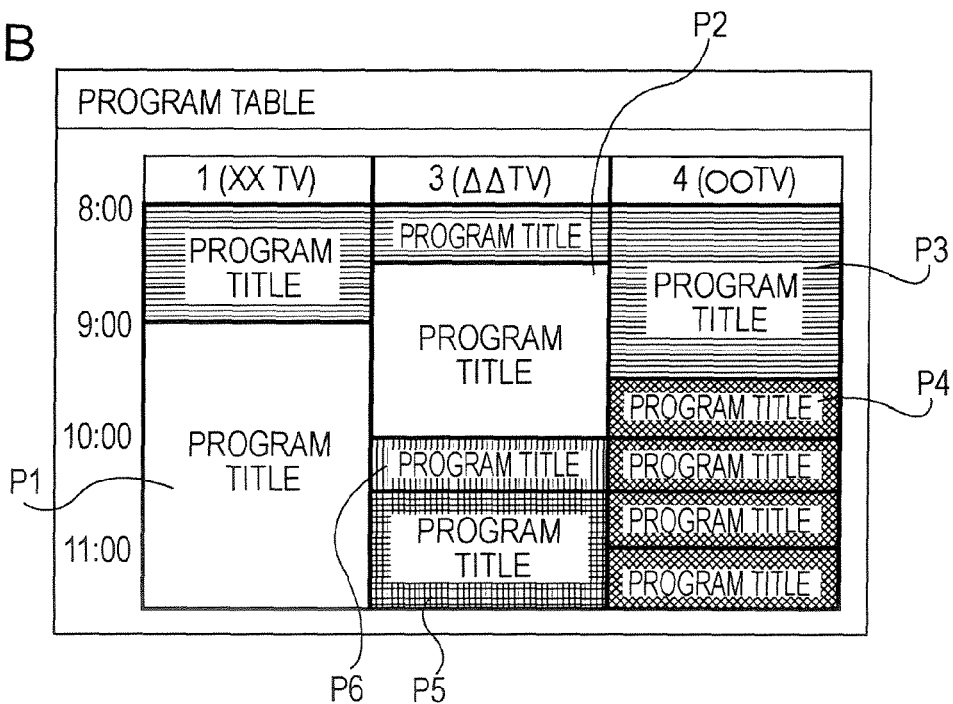
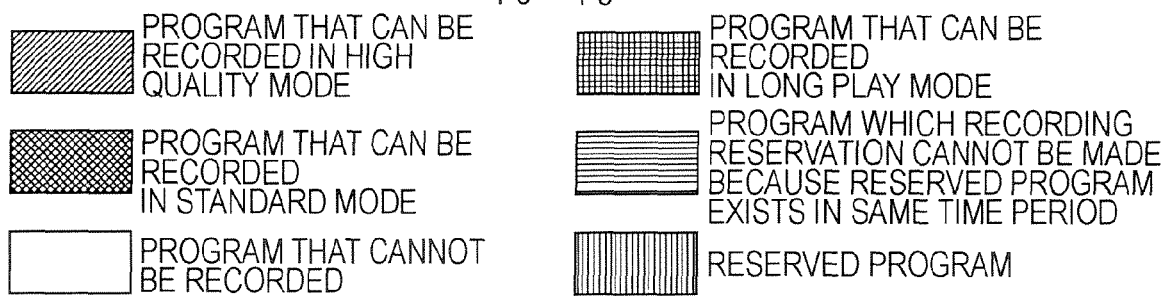

FIG. 5

| | 1 (XX TV) | 3 (ΔΔ TV) | 4 (OO TV) |
|---|---|---|---|
| 8:00 | (THERE IS ANOTHER RESERVATION) PROGRAM TITLE | (THERE IS ANOTHER RESERVATION) PROGRAM TITLE | (THERE IS ANOTHER PROGRAM) PROGRAM TITLE |
| 9:00 | | (RECORDING NOT POSSIBLE) PROGRAM TITLE | |
| | (RECORDING NOT POSSIBLE) PROGRAM TITLE | | (SP) PROGRAM TITLE |
| 10:00 | | (RESERVED) PROGRAM TITLE | (SP) PROGRAM TITLE |
| | | (LP) PROGRAM TITLE | (SP) PROGRAM TITLE |
| 11:00 | | | (SP) PROGRAM TITLE |

PROGRAM TABLE

PROGRAM RECORDING RESERVATION SYSTEM AND REMOTE CONTROLLER

CROSS REFERENCES TO RELATED APPLICATIONS

The present invention contains subject matter related to Japanese Patent Application JP 2005-316976 filed in the Japanese Patent Office on Oct. 31, 2005, the entire contents of which are incorporated herein by reference.

BACKGROUND OF THE INVENTION

1. Field of the Invention

The present invention relates to a program recording reservation system for making a recording reservation for a broadcast program and to a remote controller for making a program recording reservation therefor.

2. Description of the Related Art

In recent years, as a result of the advancement of information technology, a technology has come to be used in which a plurality of electronic apparatuses in a house are interconnected with one another over a network such as a LAN (Local Area Network), so that information is shared and managed among the electronic apparatuses.

As recording apparatuses capable of recording television broadcasts, HDD (Hard Disk Drive) recorders, which are large-capacity recording media, have been put into practical use. Since the recording capacity of an HDD recorder is as much as several hundred gigabytes, it is possible to record programs for a long duration. Furthermore, since HDD recorders have superior random search performance, they have become widely used in homes.

A network-connected HDD recorder has received an electronic program guide (EPG) and can display the broadcast station of a program, a broadcast time, excerpts of content, and the like from among the program information obtained from the EPG on the screen of a television receiver connected to the HDD recorder. A system has been provided in which a user is able to make reservations for video recording and sound recording in a recording apparatus, such as an HDD recorder that is incorporated in the television receiver or that is externally connected, by selecting a program from the displayed program table. As a result of using a electronic program guide in the manner described above, it has become possible to easily make recording reservations of programs without performing complex operations.

In Japanese Unexamined Patent Application Publication No. 1999-136646 (FIG. 2), an apparatus for providing video and audio signals of a desired channel is disclosed.

In Japanese Unexamined Patent Application Publication No. 2004-129289 (FIG. 1), there is disclosed an apparatus for obtaining information of a desired video signal that is transmitted before the video signal is received and for enabling advance detection of capability or incapability of recording and advance identification by a program table profile and level information.

In Japanese Unexamined Patent Application Publication No. 2005-244372 (FIG. 1), there is disclosed a technology for performing a reservation recording setting operation by coordinating operations of information processing apparatuses having a program recording reservation function, which are connected over a network.

In Japanese Unexamined Patent Application Publication No. 2005-244576 (FIG. 1), there is disclosed a technology for performing a program recording reservation operation in each of a plurality of apparatuses set in separate locations by suitably coordinating operations among two or more information processing apparatuses.

SUMMARY OF THE INVENTION

In the above-described HDD recorder, in the related art, it has not been possible to determine whether or not a specified program can be recorded when a program table is viewed. There are cases in which important reservations cannot be made due to the following reasons. That is, the fact that a recording reservation cannot be made on the basis of error information sent back from a recording apparatus is known after a program recording reservation operation after selecting a program is performed. An error occurs in a recording apparatus only when a time at which recording is actually performed is reached, and incapability of recording is known.

In order to deal with such a situation, a system for making a recording reservation by using service information of a digital broadcast has been proposed. The service information refers to information containing program titles and a program table, and compression-related information of video and audio signals of each program is sent. A system has been proposed in which program title columns in a program table are color-coded for each program according to the type of compression-related information on the television receiver side, the program title columns are identified using marks, and the capability or incapability of recording of the recording apparatus is determined on the basis of the compression-related information.

However, when a recording reservation is to be made using service information, capability or incapability of recording cannot be determined by a system in which a compression method is transcoded into a format that can be recorded in a recording apparatus such as an HDD recorder. Furthermore, it is not possible for the user to determine whether or not a recording reservation is possible by only viewing the program table. In addition, a determination regarding capability or incapability of recording when the remaining recording capacity of the recording apparatus is insufficient cannot be performed. Consequently, there has been a demand for a technology for more easily making recording reservations.

The present invention has been made in view of such circumstances. It is desirable to make a determination as to the capability or incapability of recording of a program when a recording reservation is to be made.

According to an embodiment of the present invention, there is provided a program recording reservation system including: a recording apparatus including a recorder for recording a broadcast program; and a remote controller for making a recording reservation for the recording apparatus, wherein there is provided a content management section for managing, as recording parameters, an average recording bit rate for each of a plurality of provided recording modes and the remaining recordable capacity of the recorder, date and time at which a broadcast program is scheduled to be broadcast are obtained as program information, a necessary recording capacity necessary for recording a program shown in the program information is computed, on the basis of the average recording bit rate for each recording mode provided by the recorder, a broadcast duration, and the remaining recordable capacity of the recorder, capability or incapability of recording of a broadcast program shown by the program information is determined, and the determined capability or incapability of recording for each program is displayed in the program table having the program information.

As a result of the above, it becomes possible to make a determination as to the capability or incapability of recording by calculating the necessary recording capacity for each program on the basis of the average bit rate for each recording mode supported by the recorder and the broadcast duration and by comparing the necessary recording capacity with the remaining recording capacity of the recorder. The determination result is displayed in the program table.

According to an embodiment of the present invention, a determination as to the capability or incapability of recording can be performed by calculating the necessary recording capacity for each program on the basis of the average bit rate for each recording mode supported by the recorder and the broadcast duration and by comparing the necessary recording capacity with the remaining recording capacity of the recorder. Therefore, when the remaining recording capacity of the recorder is small, a recording reservation can be made by setting a suitable recording mode capable of recording a program. Thus, there is an advantage that recording can be prevented from being stopped because the remaining recording capacity becomes zero while the recording is being performed.

BRIEF DESCRIPTION OF THE DRAWINGS

FIG. 3 is a sequence diagram showing an example of processing of displaying a program table according to the embodiment of the present invention;

FIGS. 4A and 4B are illustrations showing an example of the display change of a program table according to the embodiment of the present invention; and FIG. 5 is an illustration showing an example of a modification of the program table according to the embodiment of the present invention.

DESCRIPTION OF THE PREFERRED EMBODIMENTS

An embodiment of the present invention will now be described below with reference to the accompanying drawings. In this embodiment, a description will be given by taking as an example a program recording reservation system in which an HDD recorder and a remote controller are interconnected with each other over a network, and a recording reservation of a program can be set in an appropriate recording mode on the basis of program information received from an EPG server and the remaining recording capacity of the HDD recorder.

Figure 1:
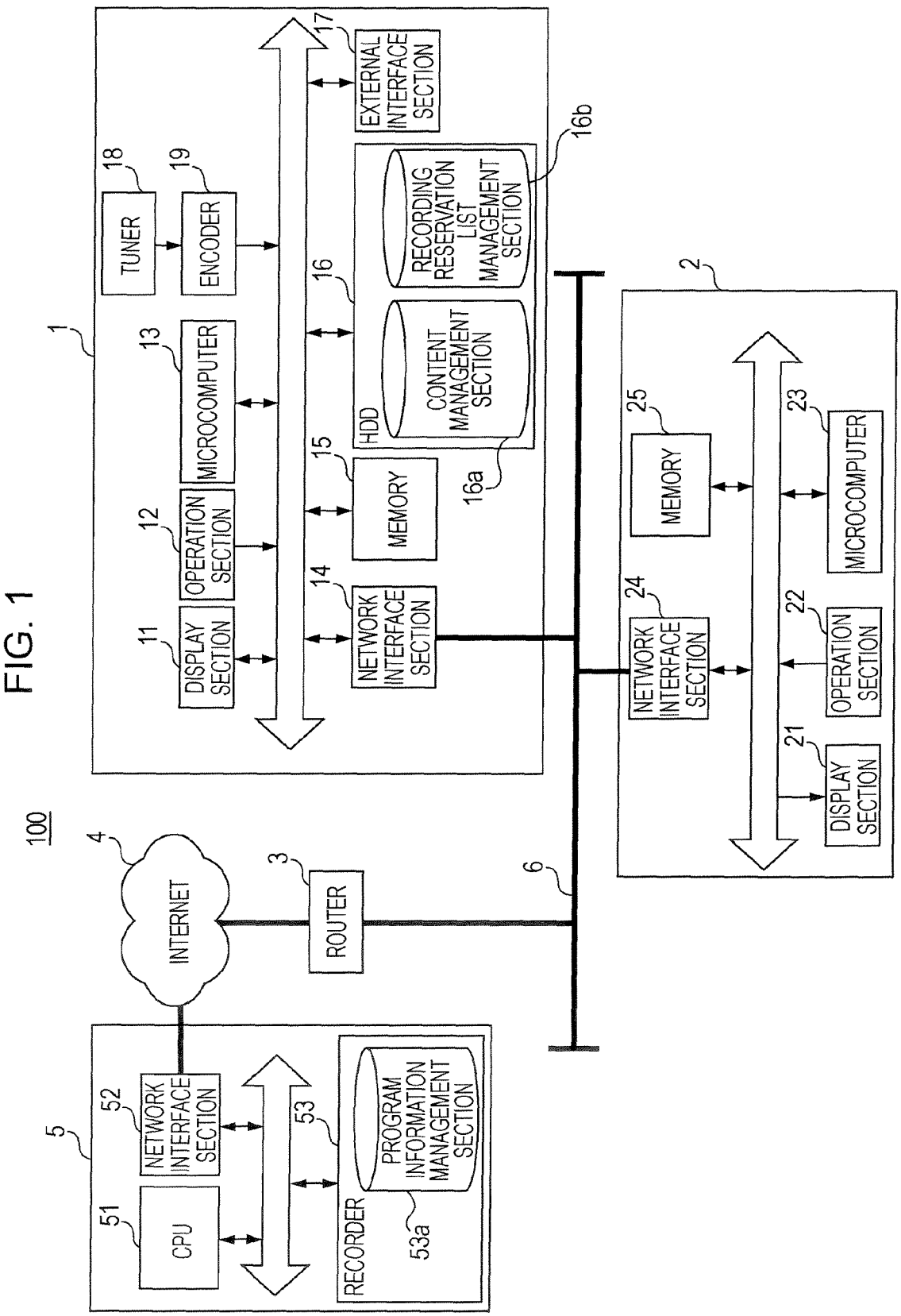
FIG. 1 is a block diagram showing an example of the internal configuration of a program recording reservation system according to an embodiment of the present invention.

First, a description will be given, with reference to FIG. 1, of an example of the configuration of a program recording reservation system according to this embodiment. An HDD recorder 1 having a hard disk drive 16, and a remote controller 2 that can be used to remotely control the HDD recorder 1 and that can receive the recording state of the HDD recorder 1 and a recording reservation list composed of the reservation date of each reservation, the start time thereof, the end time thereof, the channel thereof, the recording mode thereof, and the like constitute a local area network via a network line 6. Thus, two-direction communication is possible. The network line 6 is connected to the Internet 4 via a router 3 for performing a relay of a network and is configured to receive program information from an EPG server 5 for distributing program information. The system configured in this manner is referred to as a program recording reservation system 100. The HDD recorder 1 has functions of supplying recording-related information to the remote controller 2 via the network line 6. The remote controller 2 has a display section 21 capable of displaying the capability or incapability of recording of each program and a recording mode in which recording is possible (for example, one of a high quality mode, a standard mode, a long play mode) in a list of programs on the basis of the recording-related information obtained from the HDD recorder 1 and program information obtained from the EPG server 5.

The HDD recorder 1 receives television broadcast waves from an antenna (not shown), and a tuner 18 for performing station selection and tuning operation selects a desired broadcast station. Then, the video and audio signals for the station that is selected are supplied to an encoder 19 for performing an encoding process. The video and audio signals encoded using a predetermined recording mode are recorded in the hard disk drive 16. When the video and audio signals are to be recorded, it is necessary to have an available capacity in which recording is possible in the hard disk drive 16, and this is referred to as a remaining recording capacity. Furthermore, since a plurality of tuners are provided, it is possible to record a plurality of programs simultaneously in the same time period, and the number of programs that can be recorded in this manner is referred to as the number of programs that can be recorded simultaneously. The bit rate during recording differs for each recording mode. The higher the bit rate, the higher quality of recording possible. The average bit rate is recorded for each recording mode of the recorded program. The average bit rate is recorded as an average value determined from the recording history of the HDD recorder 1, or an appropriate value is recorded as a fixed value for each recording mode.

In the hard disk drive 16 provided in the HDD recorder 1, a content management section 16a for recording the current remaining recording capacity, the number of programs that can be recorded simultaneously in the same time period, and the average bit rate of each recording mode, and a recording reservation list management section 16b for recording the information of a recording reservation list in which recording reservations are set by the user, are configured. A microcomputer 13 for controlling each section inside the HDD recorder 1 in response to user operation from an operation section 12 having operation keys and buttons or in response to user operation from the remote controller 2 via a network interface section 14 performs a predetermined process. In a memory 15, for example, a rewritable RAM (Random Access Memory) is used to temporarily store data. Furthermore, in the memory 15, for example, a read only memory (ROM) is used to store processing programs, parameters, codes corresponding to operation keys, etc. The microcomputer 13 reads a processing program or the like from the memory 15 in order to execute it, displays processing results on a display section 11 having a liquid-crystal display panel, decodes a video signal or a program recorded in the hard disk drive 16 and outputs video and audio signals to an external interface section 17 in order to display the processing results on the screen of a television receiver (not shown).

The remote controller 2 can be used to remotely control the HDD recorder 1 by transmitting a predetermined control signal to the HDD recorder 1. Key code input from each key provided in an operation section 22 is supplied to a microcomputer 23 for performing internal control of the remote controller 2. In a memory 25, a rewritable RAM is used to temporarily store data. Furthermore, in the memory 25, for example, a read only memory (ROM) is used to store processing programs, parameters, codes corresponding to operation keys, and the like. The microcomputer 23 reads a processing program or the like from the memory 25 in order to executes it, and supplies a predetermined remote control signal to a network interface section 24. In the network interface section 24, a signal received from the HDD recorder 1 and the EPG server 5 is decoded and supplied to the microcomputer 23. The microcomputer 23 performs control so that various kinds of recording reservation information are received from the HDD recorder 1 and a program table (to be described later) is displayed on the liquid-crystal display panel of the display section 21.

The router 3 has a function of relaying between the internal LAN and the external Internet 4. The router 3 sends a program information request from the remote controller 2 to the EPG server 5 and allows the remote controller 2 to obtain program information responded from the EPG server 5.

The EPG server 5 is connected from the remote controller 2 via the Internet 4, so that a program table can be obtained. In the EPG server 5, a random accessible hard disk drive 53 is connected via a network interface section 52 that functions as an interface for the Internet and the EPG server 5. In the hard disk drive 53, a program information management section 53a for managing program information is configured. A CPU 51 for controlling processing of each section obtains program information from the program information management section 53a in response to a request for program information from the remote controller 2 and provides it from the network interface section 52 to the remote controller 2 via the Internet 4 and the router 3.

Figure 2:
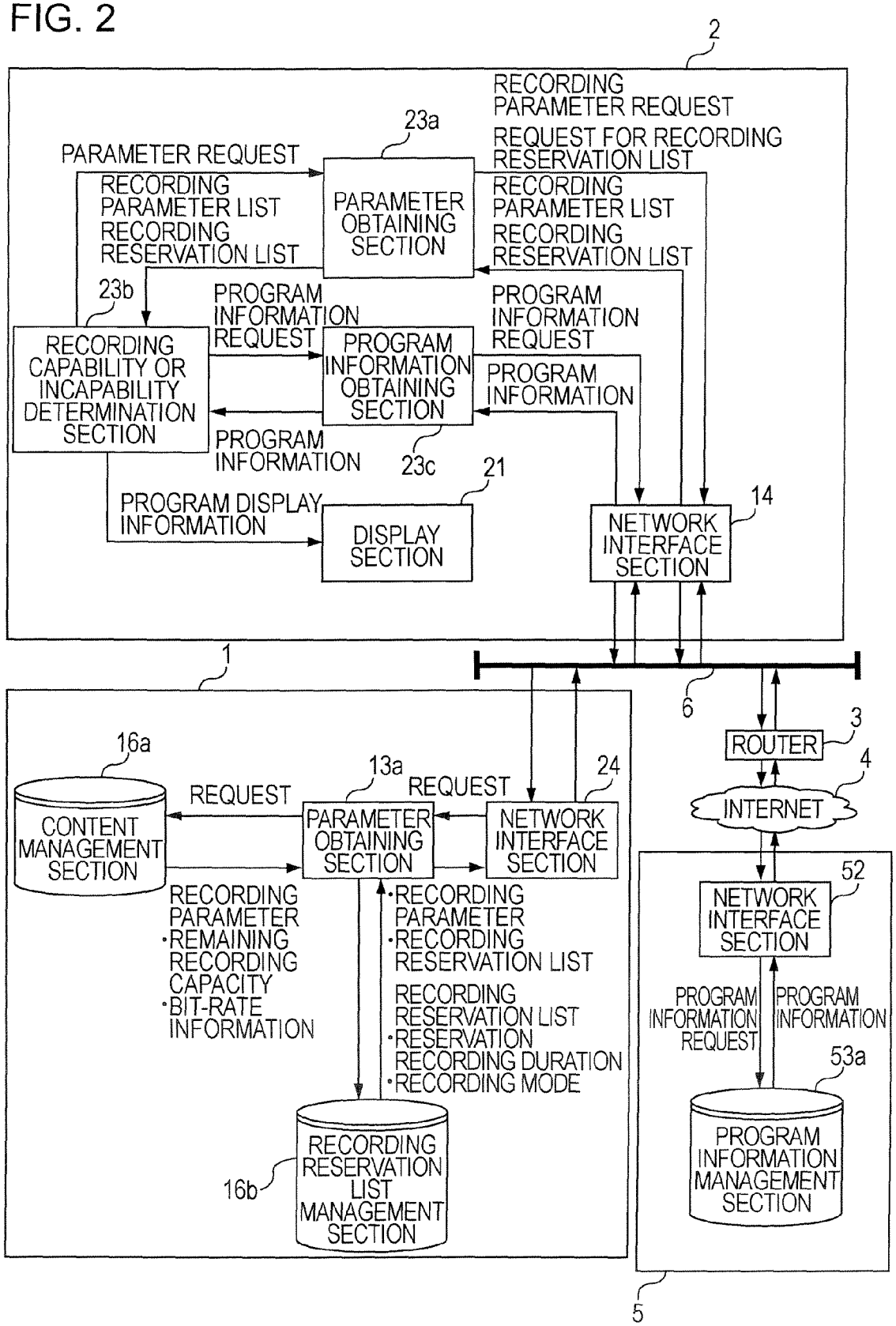
FIG. 2 is a block diagram showing an example of the functions of the program recording reservation system according to the embodiment of the present invention.

Next, a description will be given, with reference to FIG. 2, of an example of the configuration when viewed in terms of the functions of the program recording reservation system 100 according to this embodiment.

First, the current remaining recording capacity of the HDD recorder 1, the average recording bit-rate information for each recording mode, the number of programs that can be recorded simultaneously, and the like are referred to as a recording parameter list, and the recording parameter list is obtained from the HDD recorder 1. The display of the display section 21 of the remote controller 2 is switched to a program table display screen. At this time, a request for recording parameters is sent from a recording capability or incapability determination section 23b for making a determination as to the capability or incapability of recording on the basis of the recording parameter list and a recording reservation list (to be described later) to a parameter obtaining section 23a for creating a recording parameter request command. The parameter obtaining section 23a creates a recording parameter request command in a predetermined format and sends it to the HDD recorder 1 via the network interface section 14.

In the HDD recorder 1, the parameter obtaining section 13a for obtaining management information receives a request command from the content management section 16a via the network interface section 24. Then, recording parameters, such as the current remaining recording capacity, the number of programs that can be recorded simultaneously, and the average recording bit-rate information for each recording mode, are obtained from the content management section 16a. The average bit rate may be an average value determined in the past from the recording history of the HDD recorder 1, or an appropriate value may be sent back as a fixed value for each recording mode. The HDD recorder 1 according to this example is assumed to have three kinds of recording modes that can be supported, that is, a high quality (HQ) mode, a standard play (SP) mode, and a long play (LP) mode, which are determined according to a codec and differences in resolution. On the basis of each of the obtained recording parameters, the parameter obtaining section 13a creates a response message for the request command. Then, a response message for the recording parameter list is sent to the remote controller 2 via the network interface section 24.

In the remote controller 2, the parameter obtaining section 23a receives the response message for the recording parameter request via the network interface section 14. Then, in the parameter obtaining section 23a, the message is divided into recording parameters and is sent to the recording capability or incapability determination section 23b.

Here, recording reservation information, such as scheduled recording durations of programs that have been scheduled to be recorded, and recording modes thereof, are referred to as a recording reservation list, and the recording reservation list is obtained from the HDD recorder 1. A request for a recording reservation list is sent from the recording capability or incapability determination section 23b to the parameter obtaining section 23a for creating a recording-reservation-list request command. The parameter obtaining section 23a creates a command for requesting a recording reservation list in a predetermined format and sends the recording reservation list to the HDD recorder 1 via the network interface section 14.

In the HDD recorder 1, the parameter obtaining section 13a receives a request command via the network interface section 24. Then, the parameter obtaining section 13a obtains the reservation date of each recording reservation, the start time thereof, the end time thereof, the channel thereof, the recording mode thereof, and the like, of the list of the registered recording reservations from the recording reservation list management section 16b. On the basis of the obtained recording reservation list, the parameter obtaining section 13a creates a response message for the request command from the remote controller 2. Then, a response message for the recording reservation list is sent to the remote controller 2 via the network interface section 24.

In the remote controller 2, the parameter obtaining section 23a receives the response message for the recording-reservation-list request via the network interface section 14. Then, in the parameter obtaining section 23a, the message is divided into each piece of recording reservation information and is sent to the recording capability or incapability determination section 23b.

On the basis of the received recording parameter list and the recording reservation list, the recording capability or incapability determination section 23b calculates the remaining recording capacity necessary for recording for all the reservations.

The broadcast station of a program to be broadcast, the broadcast time period thereof, the content thereof, and the like are referred to as program information, and a program table is obtained from the EPG server 5. In the remote controller 2, a request for program information is sent from the recording capability or incapability determination section 23b to a program information obtaining section 23c for creating a program information request command. The program information obtaining section 23c creates a program information request command in a predetermined format and sends the program information request from the network interface section 14 to the EPG server 5 via the router 3 and the Internet 4. In the EPG server 5, the program information management section 53a receives a request command via the network interface section 52. Then, the program information registered in the program information management section 53a is obtained. On the basis of the program information, a response message for the request command from the remote controller 2 is created. Then, a response message for the request command is sent from the network interface section 52 to the remote controller 2 via the Internet 4 and the router 3.

In the remote controller 2, the program information obtaining section 23c receives a response message for the program table information request via the network interface section 14. Then, the message is divided into each piece of the program information and is sent to the recording capability or incapability determination section 23b.

On the basis of the obtained recording parameters, the recording reservation list, and the program information, the recording capability or incapability determination section 23b specifies a program that is scheduled to be recorded in the same time period and for which an additional recording reservation is not possible and specifies a program for which a recording reservation is not possible by considering the remaining capacity of the recording apparatus. Furthermore, a program for which a recording reservation is possible at the highest quality with respect to programs for which a recording reservation is possible. Then, display information that is color-coded for each program is transmitted to the display section 21 and is displayed as a program table on the display section 21.

Next, a description will be given, with reference to FIG. 3, processing for obtaining program information and for displaying the capability or incapability of recording of each program and recording modes in which video recording is possible on the remote controller 2. FIG. 3 is a sequence diagram showing an example of processing for displaying a program table on the display section 21 of the remote controller 2.

Initially, in order to display the program information on the remote controller 2, the display is switched to a program table display screen, and then a request for a recording parameter is made from the remote controller 2 to the HDD recorder 1 (step ST1). In response to the request, the HDD recorder 1 responds back with recording parameters, such as the current remaining recording capacity, the average recording bit-rate information for each recording mode that can be supported, and the number of programs that can be recorded simultaneously (step ST2).

Next, a request for a recording reservation list is sent from the remote controller 2 (step ST3). In accordance with the request, the HDD recorder 1 responds back with the recording reservation date, the recording start time, the recording end time, and the recording mode from the recording reservation list of programs that have been scheduled to be recorded. Next, on the basis of the information on the received recording reservation list, in the remote controller 2, the remaining capacity of the recording apparatus after recording for all the currently registered reservations is performed is calculated on the basis of the following calculation equations.

The recording capacity necessary for each recording reservation=(the average bit rate of the recording mode)×(the recording duration)

The remaining capacity=(the current remaining recording capacity)−(the total sum of recording capacities necessary for recording for all the currently registered reservations)

Next, a request for program information is sent from the remote controller 2 to the EPG server 5 (step ST6). In accordance with the request, the EPG server 5 responds back with program information (step ST7). Next, programs for which an additional recording reservations is not possible are specified on the basis of the number of programs that can be recorded simultaneously and the recording reservation list obtained from the HDD recorder 1, and the program information obtained from the EPG server 5 (step ST8). It is possible for the HDD recorder 1 according to this embodiment to record a plurality of programs in the same time period. Therefore, it is necessary to make a determination as to the number of programs that can be recorded simultaneously with respect to making reservations.

For specifying a time period in which an additional recording reservation cannot be made, there are following two cases:

(1) When the number of programs that can be recorded simultaneously is one (when a plurality of programs cannot be recorded simultaneously), all the time periods registered in the recording reservation list are set to time periods in which an additional recording reservation cannot be made.

(2) When the number of programs that can be recorded simultaneously is two or more, recording reservations that are registered in an overlapping time period among the recording reservations registered in the recording reservation list are extracted, and the time period in which the number of the reservations is the same as the number of programs that can be recorded simultaneously is set to a time period in which an additional recording reservation cannot be set.

For specifying a program for which an additional recording reservation cannot be set, (3) a program overlapping the time period specified in (1) and (2) above.

Next, the broadcast duration of the program information is obtained, and after the necessary recording capacity of each program is calculated in accordance with an example of a calculation of the necessary recording capacity, the recording mode with the highest quality among the recording modes in which recording is possible is specified. A program for which the remaining capacity is insufficient in all the recording modes is determined to be that a recording reservation cannot be set (step ST9). Here, when a recording reservation is made at a constant time every day or every week, the necessary recording capacity is calculated within a predetermined period (for example, for two weeks).

Examples of calculations for the necessary recording capacity when the recording mode is a "high quality" mode, a "standard play" mode, and a "long play" mode Examples of calculations for the necessary recording capacity in each recording mode The necessary recording capacity in the high quality mode=(the average bit-rate information in the high quality mode)×(the broadcast duration)

The necessary recording capacity in the standard mode=(the average bit-rate information in the standard mode)×(the broadcast duration)

The necessary recording capacity in the long play mode=(the average bit-rate information in the long play mode)×(the broadcast duration)

For specifying the highest quality recording mode among the recording modes in which recording is possible (1) A recording mode in which the capacity is larger than the remaining capacity calculated in step ST5 among the necessary calculated recording capacities in each mode is excluded. At this time, in the case of a value greater than the remaining capacity in all the recording modes, the program is determined to be not recordable.

(2) On the other hand, when there is a recording mode in which recording is possible on the basis of the remaining capacity calculated in step ST5, the highest quality mode among those excluded is specified.

Next, on the basis of the determination results, programs that cannot be scheduled to be recorded because duplicate recording reservation cannot be made and programs that cannot be scheduled to be recorded because the remaining capacity of the recording apparatus is insufficient are color-coded and displayed in the program table. For programs that can be scheduled to be recorded, modes in which recording is possible at the highest image quality are color-coded and displayed in the program table (step ST10).

A description will now be given, with reference to FIGS. 4A and 4B, of an example of the display change of a screen when a recording reservation of a program is made using a program table. The program table of this example is displayed on the display section 21 of the remote controller 2, and the determination results are displayed in such a manner as to be color-coded. It is possible for the user to make a recording reservation of a desired program while viewing the program table screen. FIG. 4A shows an example of the display of a program table before a recording reservation is made. FIG. 4B shows an example of the display of a program table after a recording reservation is made. The vertical axis of the program table shows a time at which a program is broadcast, and the horizontal axis shows the channel number of a program and a broadcast station name.

Then, on the basis of the determination results, the programs, which are color-coded, are displayed in the program table. The recording mode differs for each duration of the program depending on the recordable capacity of the HDD recorder 1. In this embodiment, it is assumed that the recordable capacity remains in the HDD recorder 1 for the period of 30 minutes in the highest quality mode, for the period of 60 minutes in the standard mode, and for the period of 90 minutes in the long play mode. At this time, the programs are color-coded in the manner described below.

Program for which a recording reservation cannot be made because the remaining recording capacity of the recording apparatus is insufficient (program P1)

Program for which a recording reservation cannot be made because there is another recording reservation in the same time period and the number of programs that can be scheduled to be recorded in duplicate in the same time period is insufficient (program P3)

Program that can be scheduled to be recorded in all the recording modes of the highest quality mode, the standard mode, and the long play mode (programs P4 and P6)

Program that can be scheduled to be recorded in one of the standard mode and the long play mode (program P5)

Program that can be scheduled to be recorded in the long play mode (program P2)

In FIG. 4A, a case in which a recording reservation of program P6 of ΔΔ TV is made is considered. In this case, it is assumed that the recordable capacity remains in the HDD recorder 1 for the period of 0 minutes in the highest quality mode, for the period of 30 minutes in the standard mode, and for the period of 60 minutes in the long play mode. As a result of making a recording reservation, the color-coded display of the program table shifts from that of FIG. 4A to that of FIG. 4B. Since program P2 is a 90-minute program, it cannot be recorded even in the long play mode. Then, since four programs P4 from 9:30 to 11:30 of ◯◯ TV are 30-minute programs, they cannot be recorded in the high quality mode and can be recorded in the standard mode. Since program P5 is a 60-minute program, it cannot be recorded in the standard mode but can be recorded in the long play mode. With respect to the program P1 that cannot be recorded and program P3 for which a recording reservation cannot be set, the color does not change. For displaying the program table, basically, the recording mode in which recording is possible at the highest quality is set.

When the user is able to know the capability or incapability of a recording reservation of a program as a result of color-coding the program table in the manner described above, it has become possible to know at a glance about in which recording mode the recording can be performed.

According to the embodiment of the present invention, by displaying programs that are to be broadcast from now as an electronic program table using program information and by selecting a program in the program table, it is possible to make a reservation of video recording and sound recording in an incorporated or externally connected recording apparatus. For this reason, when the remaining recording capacity of the HDD recorder 1 is insufficient and recording reservations cannot be made, it is possible to visually confirm programs for which recording reservations can be made when the program table is displayed. Therefore, there is an advantage that efficient determination can be performed when compared to the case in which the capability or incapability of recording is known after a recording reservation operation is performed.

Furthermore, when the remaining recording capacity of the recording apparatus is small, it is possible to visually confirm a recording mode in which recording is possible. Therefore, there are following advantages. It is possible to set a recording mode in which recording of a program is possible before a recording reservation is made. Efficient determination can be performed when compared to the case in which the capability or incapability of recording is confirmed by repeating a recording reservation while changing the recording mode. Furthermore, the possibility that recording will not be able to be performed because the recording is stopped while recording is being performed is decreased.

Even when a recording reservation has already been made and another recording reservation cannot be made in the same time period, it is possible to visually confirm the fact by using the program table. For this reason, since the capability or incapability of a recording reservation before a recording reservation operation is performed can be determined, there is an advantage that an unnecessary operation needs not to be performed.

According to the above-described embodiment, a description has been given of the HDD recorder 1 having a function of performing communication via a network and the remote controller 2 capable of obtaining program information via the network and displaying a program table on the basis of a recording reservation list and recording reservation parameters obtained from an apparatus to be controlled. The embodiment is not limited to these examples. Even if, for example, a cellular phone terminal, a PDA (Personal Digital (Data) Assistant), a computer apparatus or the like is used as a remote controller, the same advantages as those of the above-described embodiment can be obtained.

The programs that are displayed in the program table have been color-coded and displayed in such a manner as to correspond to the recording mode in which recording is possible and recording reservations. Alternatively, guidance messages, such as recording modes and capability or incapability of recording reservations, or marks serving as predetermined identifiers, may be displayed at the beginning of the program title. FIG. 5 shows an example of the display of a program table in which video recording information is displayed at the beginning of the program title. In this case, color-coded display for each program is not performed, and, for example, "HQ", "SP", "LP", "There is another reservation", "Reserved", "Recording is not possible", and the like are described at the beginning of the program title. As a result of the above, when selecting a program for which a recording reservation is desired, identical advantages as those of the above-described embodiment are obtained.

In step ST5 of FIG. 3, the remaining recording capacity is calculated by the remote controller 2. Alternatively, the remaining recording capacity may be calculated by the HDD recorder 1, and the calculation results may be passed to the remote controller 2. In steps ST8 and ST9 of FIG. 3, a program for which a recording reservation is not possible is specified by the remote controller 2. Alternatively, by sending the broadcast start time and the broadcast end time of a program to the HDD recorder 1 or by obtaining program information by the HDD recorder 1, in the HDD recorder 1, a program for which a recording reservation cannot be made may be specified, and the result may be passed to the remote controller 2. In step ST5 of FIG. 3, a determination is made as to the capability or incapability of video recording in each recording mode on the basis of the remaining capacity necessary for recording for all the currently registered reservations. Alternatively, calculations may be performed on the basis of the current remaining capacity without using this value. As a result of the above, the calculation process can be shortened, thus presenting an advantage that the processing load on the remote controller 2 can be reduced.

The functions of the remote controller 2 may be incorporated in the HDD recorder 1, the HDD recorder 1 may obtain program information, and a program table may be displayed on a user interface (UI) screen of the HDD recorder 1. Alternatively, a program table may be displayed on an external display device, such as a television receiver connected to the external interface section 17 of the HDD recorder 1, and a recording reservation may be set using the remote controller 2.

The program information may be based on information, such as service information, which is obtained by a method other than via a network. For example, by receiving broadcast waves and by recording program information, it becomes possible to make a recording reservation of a program by Internet connection without being connected to the EPG server. Furthermore, program information received by a set top box may be shared in a LAN in which a remote controller and an HDD recorder are connected to each other. At this time, the HDD recorder has EPG information, so that it becomes possible for the remote controller to obtain a program table from the HDD recorder.

In the above-described embodiment, a recording reservation of a television broadcast has been described. Alternatively, the embodiment may be used to record a radio broadcast and an Internet program. If the duration of a program that can be received is known in advance, the necessary recording capacity can be compared with the remaining capacity, and an appropriate recording reservation can be made.

In the above-described embodiment, an HDD recorder has been used. Alternatively, the embodiment may be applied to an apparatus having identical recording functions without being limited to an HDD recorder. In this case, for the recording medium, in addition to a hard disk drive, for example, a non-volatile memory, an optical disc, a magnetic disk, a magnetic tape, and the like, may be used.

In the above-described embodiment, it has been described that the network line 6 is wired and the HDD recorder 1, the remote controller 2, and the router 3 have a wired connection. However, as long as information can be communicated mutually as in a wireless LAN network or the like, the type of transmission means is not limited.

In the above-described embodiment, regarding a program for which an additional recording reservation cannot be set, the fact that a recording reservation is possible but there are program portions that cannot be recorded during execution of recording although a recording reservation is possible. Furthermore, in a program in a time period overlapping one of the reservations registered in a recording reservation list, when some of the broadcasting time of the programs overlap, the fact that there are program portions that cannot be recorded during execution of recording may be displayed. When the entire broadcasting time of the programs overlaps, the fact that a recording reservation can be made but recording is not possible may be discriminately displayed. By making a recording reservation possible even if recording is not possible as described above, video recording becomes possible when recording reservations that are registered in duplicate are deleted or the broadcast time of a program is changed. As a result, convenience is improved for the user.

It should be understood by those skilled in the art that various modifications, combinations, sub-combinations and alterations may occur depending on design requirements and other factors insofar as they are within the scope of the appended claims or the equivalents thereof.

What is claimed is:

1. A program recording reservation system, comprising:
a recording apparatus including a recorder configured to record a broadcast program;
a remote controller configured to make a recording reservation for the recording apparatus;
a content management section included in the recording apparatus or the remote controller and configured to manage, as recording parameters, an average recording bit rate for each of a plurality of recording modes and a remaining recordable capacity of the recorder; and
a processor included in the recording apparatus or the remote controller and configured
to obtain a date and time at which a plurality of broadcast programs are scheduled to be broadcast and broadcast durations thereof as program information,
to compute, for each of the plurality of recording modes, a recording capacity for recording a program shown by the program information on a basis of the average recording bit rate of the corresponding recording mode and the broadcast duration,
to determine a capability or an incapability of recording each of the broadcast programs in the program information on a basis of the recording capacities, a capability being determined when at least one recording capacity for recording the respective broadcast program is less than the remaining recordable capacity,
to determine, for each of the broadcast programs and when the capability of recording of the respective broadcast program is determined, a recording mode having a highest quality among the plurality of recording modes on a basis of the recording capacities for recording the respective broadcast program, and
to execute a processing for displaying the determined capability or incapability of recording for each broadcast program in a program table having the program information and for displaying, when the capability of recording of the respective broadcast program is determined, the recording mode having the highest quality for each broadcast program having the capability of recording.

2. The program recording reservation system according to claim 1, further comprising:
a recording reservation list management section included in the recording apparatus or the remote controller and configured to manage recording reservation information of a broadcast program for which a recording reservation has been made in the recorder as a recording reservation list, the recording reservation list obtained from the recording reservation list management section,
wherein the processor is further configured to compute a recording capacity to record all the programs that have been scheduled to be recorded on a basis of the recording parameters for each program that has been scheduled to be recorded in the recording reservation list, and to determine a capability or an incapability of recording for each program of the program information on a basis of the recording capacity for recording for each broadcast program displayed as the program table and the remaining recordable capacity obtained by subtracting the recording capacity for recording for the reservations from the remaining recordable capacity of the recorder.

3. The program recording reservation system according to claim 2, wherein, when there are no recording modes in which recording is possible, data indicating that recording is not possible is displayed for each program to be broadcast in the program table.

4. The program recording reservation system according to claim 2, wherein the recording parameters include a number of programs that can be recorded simultaneously in a same time period, and
the processor is further configured to execute a processing for displaying, when the recording reservation list shows that an additional recording reservation in the same time period cannot be made due to a limitation on the number of programs that can be recorded simultaneously at a day and time at which a program that is scheduled to be recorded is to be broadcast, for each of broadcast programs, data indicating that a recording reservation cannot be made for a program whose broadcast scheduled date and time overlap the scheduled date and time of the program that has been scheduled to be recorded, or data indicating that the entire program cannot be recorded even if a recording reservation is made.

5. The program recording reservation system according to claim 3, wherein the determined capability or incapability is displayed in the program table color-coded for each broadcast program.

6. The program recording reservation system according to claim 3, wherein the determined capability or incapability is displayed in the program table such that a predetermined identifier is attached for each broadcast program.

7. A remote controller configured to set a recording reservation to a recording apparatus configured to allow a content management section to manage an average recording bit rate for each of a plurality of recording modes and a remaining recordable capacity of a recorder as recording parameters and to record a broadcast program in the recorder, the remote controller comprising:
a parameter obtaining section configured to obtain a recording parameter from the content management section of the recording apparatus;
a program information obtaining section configured to obtain a broadcast scheduled date and time of a plurality of broadcast programs and broadcast durations thereof as program information;
a recording capability or incapability determination section configured
to compute, for each of the plurality of recording modes, a recording capacity to record a program shown by the program information on a basis of the average recording bit rate of the corresponding recording mode and the broadcast duration,
to make a determination as to a capability or an incapability of recording each of the broadcast programs in the program information on a basis of the recording capacities, a capability being determined when at least one recording capacity for recording the respective broadcast program is less than the remaining recordable capacity,
to determine, for each of the broadcast programs and when the capability of recording of the respective broadcast program is determined, a recording mode having a highest quality among the plurality of recording modes on a basis of the recording capacities for recording the respective broadcast program; and
a display section configured to display the determined capability or incapability of recording for each broadcast program in a program table having the program information and to display, when the capability of recording of the respective broadcast program is determined, the recording mode having the highest quality for each broadcast program having the capability of recording.

8. A non-transitory computer readable recording medium encoded with instructions which, when executed by a processor, cause the processor to execute a method for displaying data indicating a capability or an incapability of recording for a program, said method comprising:
obtaining a recording parameter from a recording apparatus, the recording parameter being at least one of an average recording bit rate for each of a plurality of recording modes and a remaining recordable capacity of a recorder;
obtaining a broadcast scheduled date and time of a plurality of broadcast programs and broadcast durations thereof as program information;
computing, for each of the plurality of recording modes, a recording capacity to record a program shown by the program information on a basis of the average recording bit rate of the corresponding recording mode and the broadcast duration;
making a determination as to the capability or incapability of recording each of the broadcast programs in the program information on a basis of the recording capacities, a capability being determined when at least one recording capacity for recording the respective broadcast program is less than the remaining recordable capacity;
determining, for each of the broadcast programs and when the capability of recording of the respective broadcast program is determined, a recording mode having a highest quality among the plurality of recording modes on a basis of the recording capacities for recording the respective broadcast program; and
displaying the determined capability or incapability of recording for each broadcast program in a program table having the program information and displaying, when the capability of recording of the respective broadcast program is determined, the recording mode having the highest quality for each broadcast program having the capability of recording.

9. The program recording reservation system according to claim 1, wherein the processor is configured to determine the recording mode having the highest quality by excluding a recording mode in which the recording capacity, for recording the program, is greater than the remaining recordable capacity, and selecting the recording mode having a highest average recording bit rate among recording modes which have not been excluded.

* * * * *